R. S. ARTHUR.
SURGICAL INSTRUMENT.
APPLICATION FILED SEPT. 16, 1910.
1,014,799.
Patented Jan. 16, 1912.
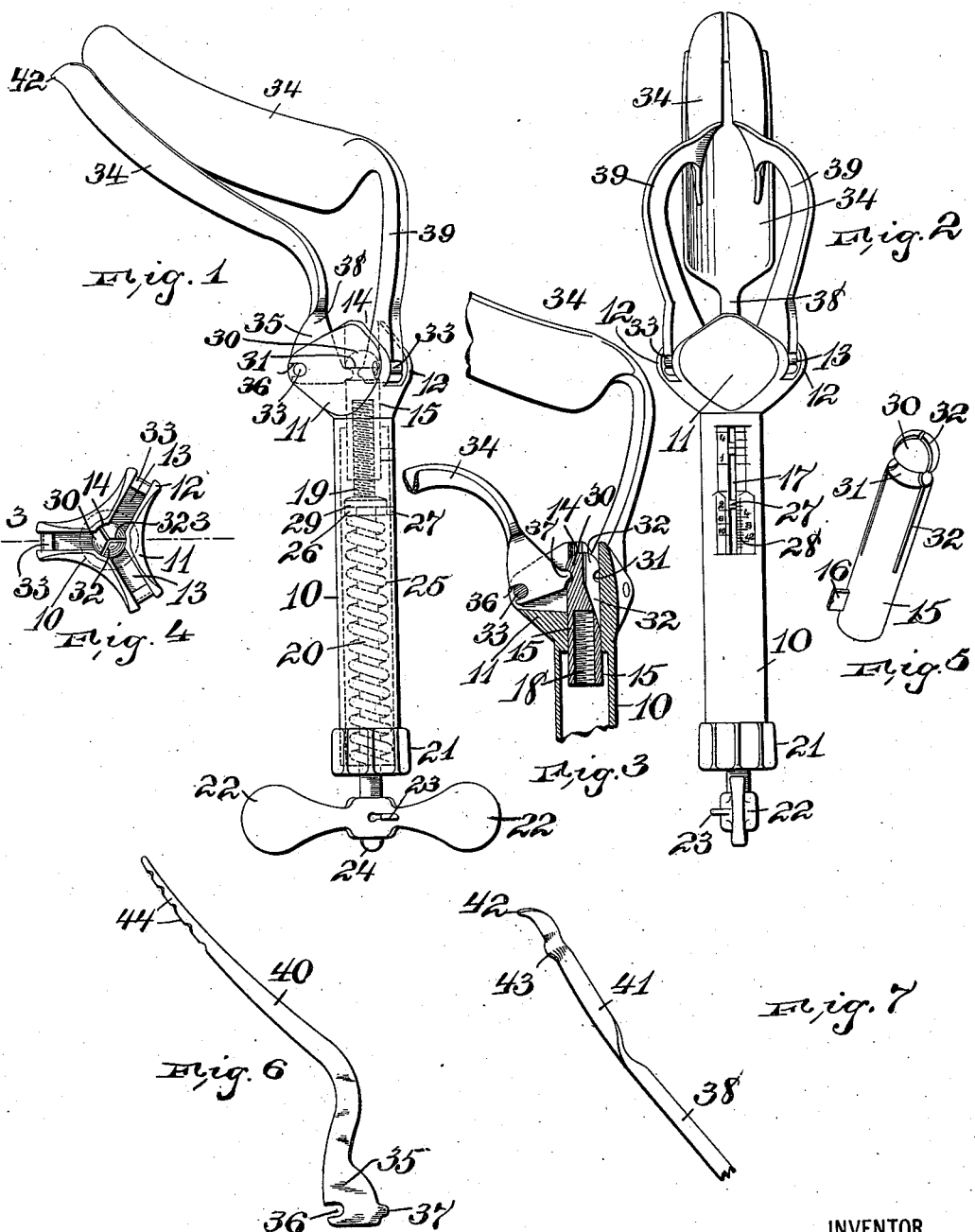
WITNESSES:
M. A. Johnson
E. A. Pell
INVENTOR
Richard S. Arthur
BY
Wm H Caufield
ATTORNEYS

UNITED STATES PATENT OFFICE.

RICHARD S. ARTHUR, OF NEWARK, NEW JERSEY.

SURGICAL INSTRUMENT.

1,014,799. Specification of Letters Patent. Patented Jan. 16, 1912.

Application filed September 16, 1910. Serial No. 582,314.

*To all whom it may concern:*

Be it known that I, RICHARD S. ARTHUR, a citizen of the United States, residing at Newark, in the county of Essex and State of New Jersey, have invented certain new and useful Improvements in Surgical Instruments; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a surgical instrument and in particular to a speculum that is adapted for vaginal uses and for any other uses to which speculums are adapted to be put. The speculum is also adapted for use with interchangeable fingers which are easily and quickly attached or detached, and which make the device applicable to a great number of uses.

The device further comprises means for operating these fingers after they are in place so that they can be forced toward each other or apart, and when forced apart they are yieldingly held so that a spasmodic or other pressure, by the parts distended, results in a giving way or collapsing of the fingers. The fingers of the speculum are so constructed that when drawn together, or at their inward limit of movement, the projecting ends are at an angle, preferably an obtuse angle, to the handle or barrel which forms the support for the fingers.

The invention is illustrated in the accompanying drawing, in which—

Figure 1 is a side view of the improved speculum, and Fig. 2 is a front view thereof. Fig. 3 is a section on line 3, 3, in Fig. 4, but partly broken away. Fig. 4 is a top view of the handle of the device with the fingers removed. Fig. 5 is a perspective view of a thimble used in the device. Figs. 6 and 7 are details of modified forms of fingers used in the speculum.

The device comprises a suitable barrel forming a handle 10, the preferred form being cylindrical, and the barrel has a head 11 on one end, the head having a series of wings 12 projecting therefrom having slots 13 formed therein. Three of these slots are usually used, although the head can be made with any suitable number. The head has a perforation 14 passing through it in line with the center of the barrel 10. In the perforation 14 is arranged a thimble 15 which slides in the head and is prevented from turning by a lug 16 which projects into a slot 17 in the barrel. The thimble is recessed and screw-threaded as at 18 to receive a screw-threaded post 19 which is connected with a stem 20 which passes through a nut 21 on the end of the barrel opposite the head, said end being provided with a handle 22 by means of which the stem is turned. The handle is preferably made so that it can be quickly attached and detached, being held in place by the friction of a spring staple 23 against the side of the stem, the stem being rounded on its end 24 to facilitate the seating of the handle when it is being attached. A coiled spring 25 is placed within the barrel and incloses the stem, the spring abutting on one end on the nut 21 and on the other end on a disk 26 which has a teat 27 projecting into the slot 17 so that the disk can not turn. This disk only serves as an indicator through the slot on the scale 28 and can be dispensed with if desired. The flange 28 bears the pressure of the spring, said flange being fastened to the stem 20. It will be seen from the drawing that the spring has a constant tendency to force the thimble 15 upward. The thimble 15 has a head 30 thereon and is provided with an annular groove 31 near the head. The head of the thimble is split, by saw-cuts 32, which gives the head the property of being slightly compressed when necessary. Bridging each slot 13 is a pin 33 which is placed near the outer end of the slot. The fingers 34 are each provided with an end plate 35 on its inner end. Each plate is flat to fit a slot 13 and has a recess 36 on its outer edge which is caught over the pin 33 in its slot, and when the thimble is slightly forced outward, by turning the handle, the nose 37 of the plate can be sprung over the rounded split head 30 of the thimble 15 and snapped into the groove 31 and held in place against accidental displacement, but it can be removed by a jerk strong enough to pull the nose 37 from the groove 31 by overcoming the resiliency of the spring head 30. The spreading or operative portion of the fingers can be of any desired configuration, as will be hereinafter described, but in all cases they must be made with shanks to place the fingers in juxtaposition when the thimble is drawn downward in the head by the screw post 19 being turned in the screw-threaded recess 18 by turning the handle 22. The fingers shown in Figs. 1, 2 and 3 illustrate this when the bottom finger has a shank 38 which is short, and the upper fingers have the curved and comparatively long shanks 39 which bring the upper fingers close down on the lower finger so that the speculum can be inserted. After it is inserted the handle 22 is turned, the handle 10 being held by one hand, and the thimble is forced up by the screw-threaded post 19. The thimble carries with it the noses 37 of the plates 35 of the fingers, and the fingers, swinging on the pins 33, are moved away from each other as in Fig. 3. This movement is retarded at first by the natural resistance of the muscles undergoing distention and reacts, through the thimble and stem, on the spring 25 and forces it to be slightly compressed, the teat 27 showing on the scale 28 the number of pounds tension necessary to force the fingers apart. The particular disposition of the fingers, that is, their being placed at an angle to the handle, permits an inspection between the distended fingers which is not interfered with by the handle or the operating parts. The spring, by its compressibility, allows the fingers to be forced together by excessive spasmodic compression of the parts distended. The fingers in this speculum can be easily and quickly changed, and different fingers can be used on the same barrel. In Figs. 1, 2 and 3 I show fingers of spatulate form, and in Fig. 6 I show a narrow or rod finger 40, one only of the set being shown, the bottom one. In Fig. 7 is shown the bottom finger of a set which has a long shank, the shank 38 in the drawing being broken away. The widened part 41 of the finger has the usual outwardly turned end 42 to prevent slipping, and I have found that a bulged or raised ridge 43 gives excellent results by preventing the muscles engaged by the finger from slipping over the end of the finger. A similar function is performed by the ridges 44 of the finger 40, in Fig. 6.

The particular form of thimble, or the plates to engage it, is not the only construction that can be used for operating the fingers, and I do not wish to be understood as limiting myself to the device illustrated.

Having thus described my invention, what I claim is:

1. A speculum comprising a barrel having a head thereon, the head having slots therein, a set of fingers having plates on their inner ends, the plate of each finger having a recess on its outer edge and a nose on its inner edge, pins so arranged that each pin bridges a slot in the head, the plates of the fingers being adapted to have their recessed portions detachably fitted over the pins, the fingers having their projecting ends projecting at an obtuse angle to the handle and all to one side thereof, and means extending through the barrel and engaging the noses on the plates for swinging the fingers toward and from each other.

2. A speculum comprising a barrel having a head thereon, the head having radial slots therein, a pin bridging each slot, a thimble arranged to slide in the head, means for operating the thimble to slide it, fingers, each finger having a recessed portion to detachably receive a pin in one of the slots and having a nose to engage the thimble and spring means on the thimble with which the noses of the fingers engage to detachably secure them so that when the thimble is slid the fingers are swung toward or from each other.

3. A speculum comprising a barrel having a head thereon, the head having radial slots therein, a pin in each slot, a thimble arranged to slide in the head, means for sliding the thimble, said means extending through the barrel, an annular groove on the thimble, the thimble having a rounded head which is split to give the head a spring action, and fingers, each finger having a plate provided with a recess on one edge to receive a pin in one of the slots of the head and having a nose on its other edge, said nose being adapted to be sprung over the spring head of the thimble and be seated in the annular groove.

4. A speculum comprising a head having radial slots therein, a pin extending across each slot, fingers, each finger having a plate on one end, the plate having a recess in one edge and a nose on the opposite edge, the recess of each plate being adapted to receive one of the pins, a thimble sliding in the head and having a rounded end, the thimble having an annular groove below the rounded end and being split on its rounded end to give it a spring action whereby the noses on the plates can be sprung over the rounded end and into the annular groove of the thimble, a suitable support for the head, and means for sliding the thimble to cause the fingers to be swung toward or from each other.

5. A speculum comprising a barrel forming a handle, a stem in the barrel terminating in a screw-threaded post, a head on the barrel, the head being slotted, a pin bridging each slot, fingers having plates on one end of each finger, each plate having a recess on one edge and a nose on the opposite edge, the recess being adapted to receive a pin and to permit the plate to swing in a slot in the head, means for turning the stem, and a thimble sliding in the head, the thimble having a screw-threaded recess to receive the post and having a rounded split head and an annular groove adjacent to the head, the groove being adapted to receive the noses of the plates.

6. A speculum comprising a barrel, a head on the barrel, a set of fingers, co-acting means on the head and the fingers for detachably securing the fingers in swinging relation to the head, and means for engaging the fingers to swing them on the head, the engaging means being adapted to be detachable from the fingers whereby the fingers can be jerked outward from engagement with the engaging means and then detached from the head.

7. A speculum comprising a barrel, a head on the barrel, a set of fingers, co-acting means on the head and the fingers for detachably securing the fingers in swinging relation to the head, and means passing through the barrel for engaging the fingers to swing them on the head, the engaging means and the fingers having co-acting spring connections whereby the fingers can be jerked from engagement with the engaging means and then detached from the head, the engaging means normally acting to operate the fingers so that they can be swung toward or from each other.

8. A speculum comprising a barrel, a head on the barrel, the head having slots therein, pins bridging the slots, a set of fingers arranged to swing in the slots and to be detachably pivoted on the pins, a stem in the barrel having a screw-threaded post thereon, a thimble having a screw-threaded recess to engage the post, the thimble having means thereon for detachably securing it to the fingers, means for operating the stem and post to slide the thimble in the head to swing the fingers toward and from each other, a flange on the stem, and a spring engaging the flange and tending to force the stem and the thimble upward to swing the fingers apart.

9. A speculum comprising a barrel, a head on the barrel, the head being slotted, a set of fingers, means for detachably pivoting the fingers in the slots, a thimble sliding in the head, the thimble having a rounded head which is split to give it a spring action, the thimble also having an annular groove adjacent to the head, noses on the fingers adapted to be sprung over the head and into the groove of the thimble, a screw-threaded post adapted to enter the thimble and when rotated operating to slide the thimble in the head, means for preventing rotation of the thimble, a stem on the post, means for operating the stem, a flange on the stem, and a spring abutting on the flange and acting to force the stem and the thimble outward to normally throw the fingers apart.

10. A speculum comprising a barrel having a head on one end, fingers detachably secured in swinging relation to the head, and an operating means passing through the barrel, the operating means and each finger having co-acting elements to detachably secure them together whereby each finger can be independently detached from both the head and the operating means.

In testimony that I claim the foregoing, I have hereunto set my hand this 23rd day of August, 1910.

RICHARD S. ARTHUR.

Witnesses:
  WM. H. CAMFIELD,
  M. A. JOHNSON.